(12) United States Patent
Fujishita

(10) Patent No.: US 8,351,069 B2
(45) Date of Patent: Jan. 8, 2013

(54) IMAGE PROCESSING DEVICE, SYSTEM, AND PROGRAM PRODUCT TO GENERATE COMPOSITE DATA INCLUDING EXTRACTED DOCUMENT IMAGES EACH WITH AN IDENTIFIED ASSOCIATED ANCILLARY IMAGE

(75) Inventor: Masahiro Fujishita, Aichi (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 437 days.

(21) Appl. No.: 12/711,687

(22) Filed: Feb. 24, 2010

(65) Prior Publication Data
US 2010/0225941 A1    Sep. 9, 2010

(30) Foreign Application Priority Data

Mar. 3, 2009 (JP) ................................. 2009-049275

(51) Int. Cl.
*H04N 1/387* (2006.01)
*G06K 15/00* (2006.01)

(52) U.S. Cl. ...................................... 358/1.18; 358/450
(58) Field of Classification Search .................... 358/1.2, 358/1.9, 2.1, 1.18, 527, 537, 538, 540, 448, 358/450–462
See application file for complete search history.

(56) References Cited

U.S. PATENT DOCUMENTS

| 4,807,287 | A | 2/1989 | Tucker et al. |
| 5,745,664 | A | 4/1998 | Nomura et al. |
| 6,002,798 | A | 12/1999 | Palmer et al. |
| 6,178,273 | B1 | 1/2001 | Kuga |
| 6,370,568 | B1 | 4/2002 | Garfinkle |
| 7,015,911 | B2 | 3/2006 | Shaughnessy et al. |
| 7,424,672 | B2 | 9/2008 | Simske et al. |
| 7,840,092 | B2 | 11/2010 | Sato et al. |
| 8,169,652 | B2 * | 5/2012 | Yoda .............................. 358/1.18 |
| 8,184,343 | B2 * | 5/2012 | Tani et al. ........................ 358/1.9 |
| 2003/0068099 | A1 | 4/2003 | Chao et al. |

(Continued)

FOREIGN PATENT DOCUMENTS

JP    5-81266    4/1993

(Continued)

OTHER PUBLICATIONS

Notice of Allowance dated Apr. 3, 2012 from related application U.S. Appl. No. 12/711,700.

(Continued)

*Primary Examiner* — Scott A Rogers
(74) *Attorney, Agent, or Firm* — Scully, Scott, Murphy & Presser, PC

(57) ABSTRACT

An image processing device acquires image data of set document sheets in a single acquiring operation, extracts from the image data document images respectively based on the document sheets, specifies a position of each document image defined on the image data, provides each document image with a first identification based on the specified positions of the document images, inputs data for creating ancillary images, provides each ancillary image based on the input data with a second identification, identifies an ancillary images as being associated with one of the document images, based on the first and second identifications, generates one or more pages of composite data, each page of the composite data containing one or more combinations each of which includes one of the document images and an ancillary image identified as being associated with the one of the document images, and outputs each page of the composite data.

13 Claims, 11 Drawing Sheets

U.S. PATENT DOCUMENTS

| | | |
|---|---|---|
| 2003/0160977 A1 | 8/2003 | Nishikawa et al. |
| 2003/0202193 A1 | 10/2003 | Yokochi |
| 2004/0169664 A1 | 9/2004 | Hoffman et al. |
| 2006/0119885 A1 | 6/2006 | Jeon et al. |
| 2007/0089053 A1 | 4/2007 | Uhlig et al. |
| 2007/0091373 A1 | 4/2007 | Sato et al. |
| 2008/0184156 A1 | 7/2008 | Sato |
| 2009/0016605 A1 | 1/2009 | Chao et al. |
| 2010/0214584 A1 | 8/2010 | Takahashi |
| 2010/0220343 A1* | 9/2010 | Horikawa .................... 358/1.18 |

FOREIGN PATENT DOCUMENTS

| | | |
|---|---|---|
| JP | 8-289132 | 11/1996 |
| JP | 2001-56857 | 2/2001 |
| JP | 2001-76127 | 3/2001 |
| JP | 2006-114971 | 4/2006 |
| JP | 2006-135819 | 5/2006 |
| JP | 2007-49518 | 2/2007 |
| JP | 2007-116469 | 5/2007 |
| JP | 2010-200070 | 9/2010 |

OTHER PUBLICATIONS

U.S. Office Action dated Apr. 4, 2012 from related application U.S. Appl. No. 12/711,772.

Decision to Grant a Patent dated Jan. 24, 2012 received from the Japanese Patent Office from related Japanese Application No. 2009-289047 and U.S. Appl. No. 12/894,714, together with a partial English-language translation.

Official Action dated Nov. 9, 20-12 from related U.S. Appl. No. 12/894,714.

* cited by examiner

IMAGE PROCESSING DEVICE, SYSTEM, AND PROGRAM PRODUCT TO GENERATE COMPOSITE DATA INCLUDING EXTRACTED DOCUMENT IMAGES EACH WITH AN IDENTIFIED ASSOCIATED ANCILLARY IMAGE

CROSS-REFERENCE TO RELATED APPLICATION

This application claims priority under 35 U.S.C. §119 from Japanese Patent Application No. 2009-049275 filed on Mar. 3, 2009. The entire subject matter of the application is incorporated herein by reference.

BACKGROUND

1. Technical Field

The following description relates to one or more image processing techniques for generating and outputting composite image data.

2. Related Art

An image processing device has been known which combines an image (an ancillary image) based on a character string input by a user with an image acquired by scanning a document.

SUMMARY

According to such an image processing device, when combining respective different character strings with a plurality of document sheets, a user has to read the document sheets on a sheet-by-sheet basis and input a corresponding character string as needed for each of the document sheets. Namely, the above technique requires the user to perform the troublesome operations for each of the document sheets.

Aspects of the present invention are advantageous to provide one or more improved techniques that make it possible to output, in a user-friendly manner, composite image data in which an ancillary image is combined with each image acquired from one or more document sheets.

According to aspects of the present invention, an image processing device is provided, which is configured to generate and output composite data in which two or more images are combined. The image processing device includes an image acquiring unit configured to acquire image data of one or more document sheets in a single acquiring operation, an image extracting unit configured to extract, from the acquired image data, document images respectively based on the document sheets, an image position specifying unit configured to specify a position of each of the extracted document images which position is defined on the acquired image data, a first identification providing unit configured to provide each of the document images with a first identification for identifying the document image, based on the specified positions of the document images, an input unit configured to input data for creating one or more ancillary images, a second identification providing unit configured to provide each of the ancillary images created based on the input data with a second identification for identifying the ancillary image, an ancillary image identifying unit configured to identify one of the ancillary images as being associated with one of the document images, based on the first and second identifications, a composite data generating unit configured to generate one or more pages of composite data, each page of the composite data containing one or more combinations each of which includes one of the document images and an ancillary image identified by the ancillary image identifying unit as being associated with the one of the document images, and an output unit configured to output each page of the composite data generated by the composite data generating unit.

In some aspects of the present invention, the image processing device configured as above makes it possible to reduce a burden placed on a user who attempts to obtain an output image on which a document image is combined with a user-desired ancillary image.

According to aspects of the present invention, further provided is an image processing system configured to generate and output composite data in which two or more images are combined. The image processing system includes an image acquiring unit configured to acquire image data of one or more document sheets in a single acquiring operation, an image extracting unit configured to extract, from the acquired image data, document images respectively based on the document sheets, an image position specifying unit configured to specify a position of each of the extracted document images which position is defined on the acquired image data, a first identification providing unit configured to provide each of the document images with a first identification for identifying the document image, based on the specified positions of the document images, an input unit configured to input data for creating one or more ancillary images, a second identification providing unit configured to provide each of the ancillary images created based on the input data with a second identification for identifying the ancillary image, an ancillary image identifying unit configured to identify one of the ancillary images as being associated with one of the document images, based on the first and second identifications, a composite data generating unit configured to generate one or more pages of composite data, each page of the composite data containing one or more combinations each of which includes one of the document images and an ancillary image identified by the ancillary image identifying unit as being associated with the one of the document images, and an output unit configured to output each page of the composite data generated by the composite data generating unit.

In some aspects of the present invention, the image processing system configured as above provides the same effect as the aforementioned image processing device. Namely, the image processing system makes it possible to reduce a burden placed on a user who attempts to obtain an output image on which a document image is combined with a user-desired ancillary image.

According to aspects of the present invention, further provided is a computer readable medium storing computer readable instructions that cause a processor, which includes an image acquiring unit, to perform an image acquiring step of acquiring image data of one or more document sheets set on the image acquiring unit, in a single acquiring operation, an image extracting step of extracting, from the acquired image data, document images respectively based on the document sheets, an image position specifying step of specifying a position of each of the extracted document images which position is defined on the acquired image data, a first identification providing step of providing each of the document images with a first identification for identifying the document image, based on the specified positions of the document images, an input step of inputting data for creating one or more ancillary images, a second identification providing step of providing each of the ancillary images created based on the input data with a second identification for identifying the ancillary image, an ancillary image identifying step of identifying one of the ancillary images as being associated with one of the document images, based on the first and second identifications, a composite data generating step of generating one or more pages of composite data, each page of the composite data containing one or more combinations each of which includes one of the document images and an ancillary image identified in the ancillary image identifying step as being associated with the one of the document images, and an output step of outputting each page of the composite data generated in the composite data generating step.

In some aspects of the present invention, the computer readable medium configured as above provides the same effect as the aforementioned image processing device and system. Namely, the computer readable medium makes it possible to reduce a burden placed on a user who attempts to obtain an output image on which a document image is combined with a user-desired ancillary image.

BRIEF DESCRIPTION OF THE ACCOMPANYING DRAWINGS

FIG. 1 schematically shows a configuration of a printing system according to one or more aspects of the present invention.

FIG. 2 is a flowchart showing a procedure of a control program to be executed by a computer according to one or more aspects of the present invention.

FIG. 3 exemplifies a before-scanning preview screen according to one or more aspects of the present invention.

FIG. 4 exemplifies a layout selection screen according to one or more aspects of the present invention.

Figure 8:
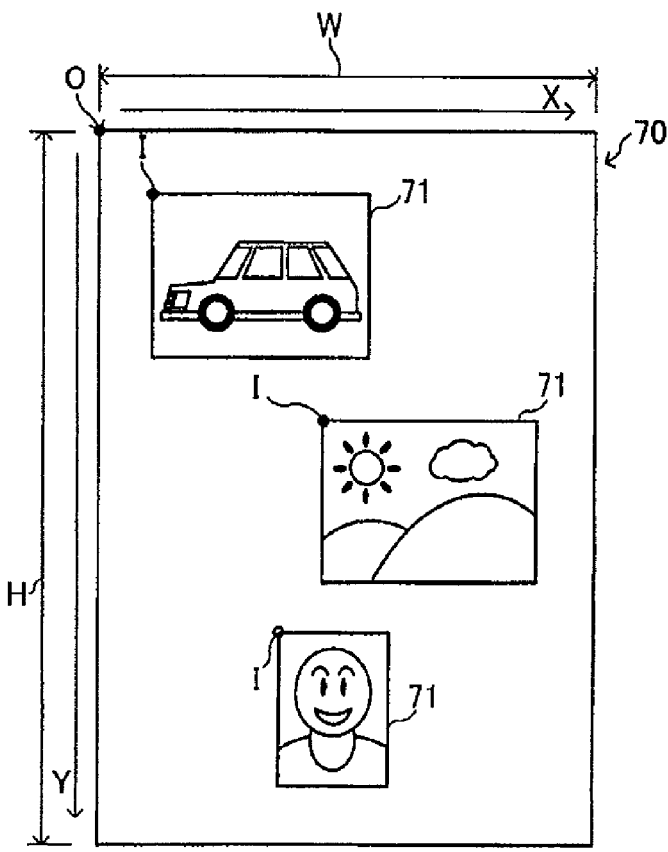

FIG. 8 exemplifies scanned data according to one or more aspects of the present invention.

Figure 9:
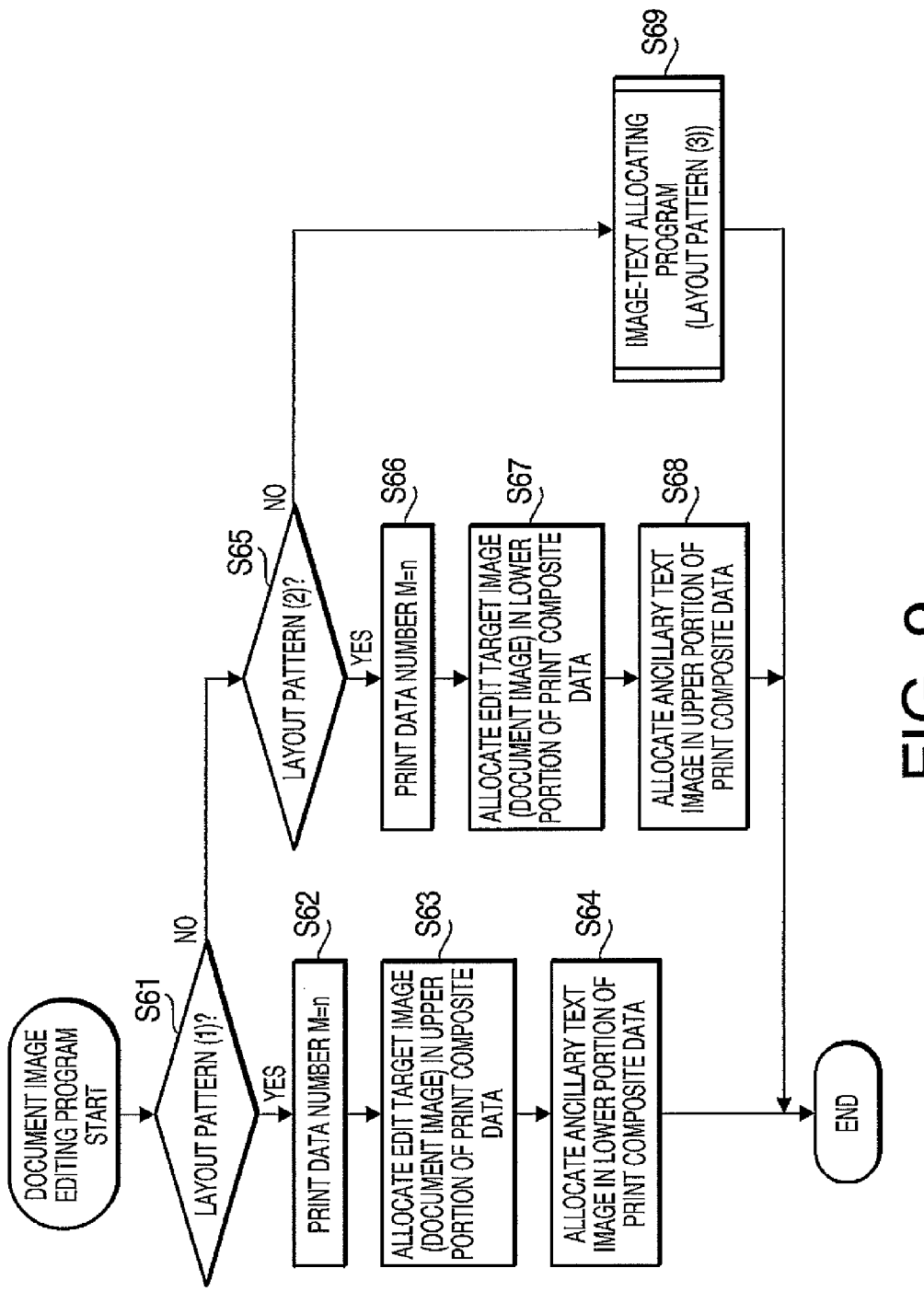

FIG. 9 is a flowchart showing a procedure of a document image editing program according to one or more aspects of the present invention.

Figure 10:
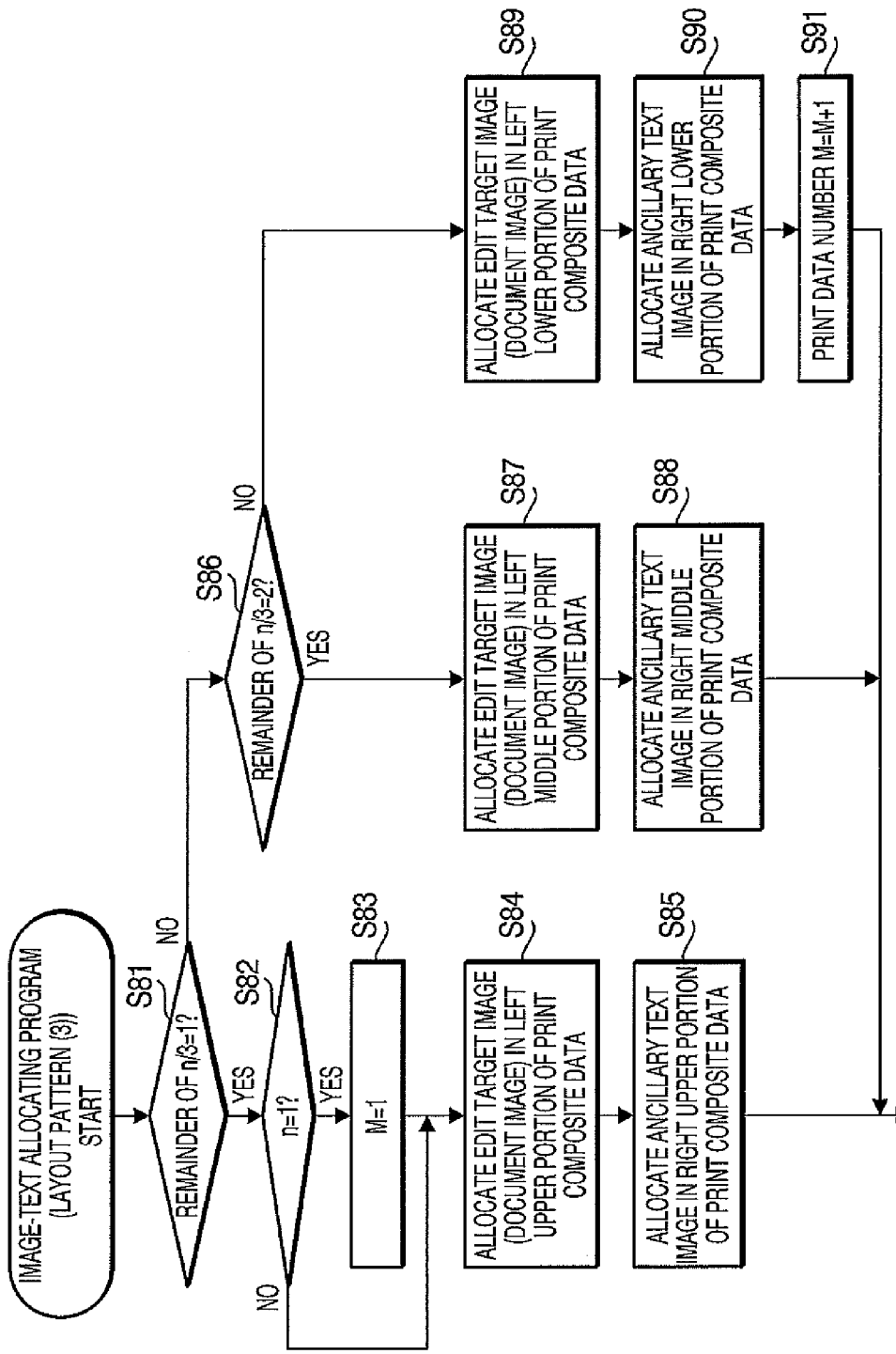

FIG. 10 is a flowchart showing a procedure of an image-text allocating program for setting a layout pattern (3) according to one or more aspects of the present invention.

Figure 11:
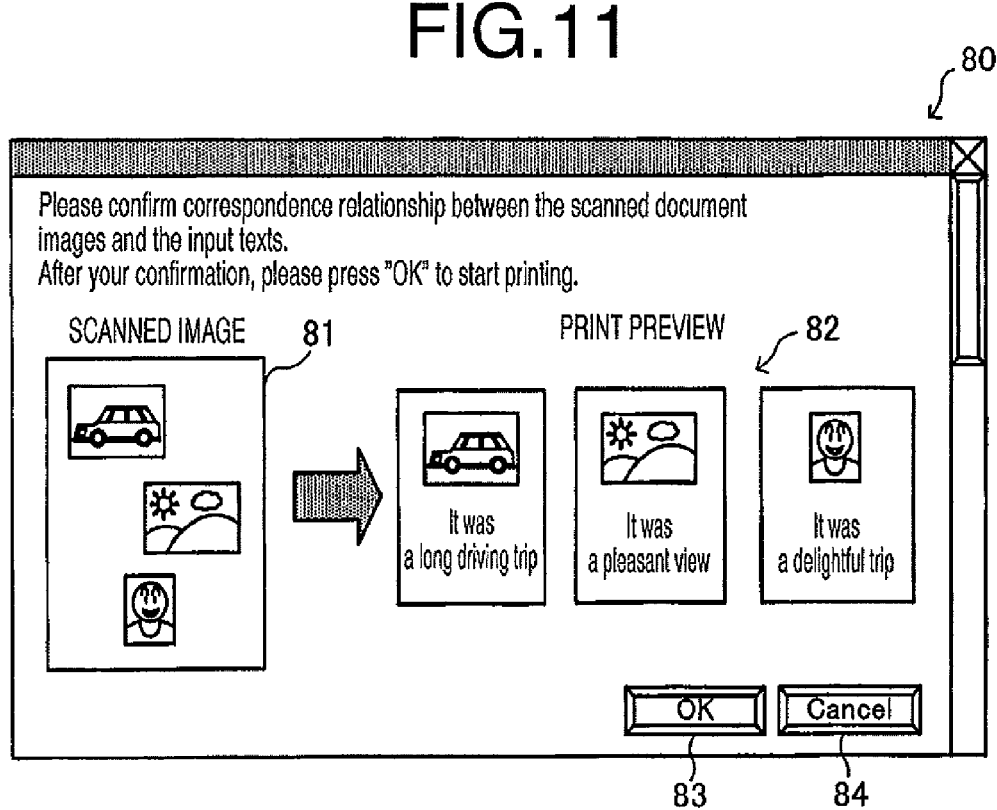

FIG. 11 exemplifies a print preview screen for setting a layout pattern (1) according to one or more aspects of the present invention.

Figure 12:
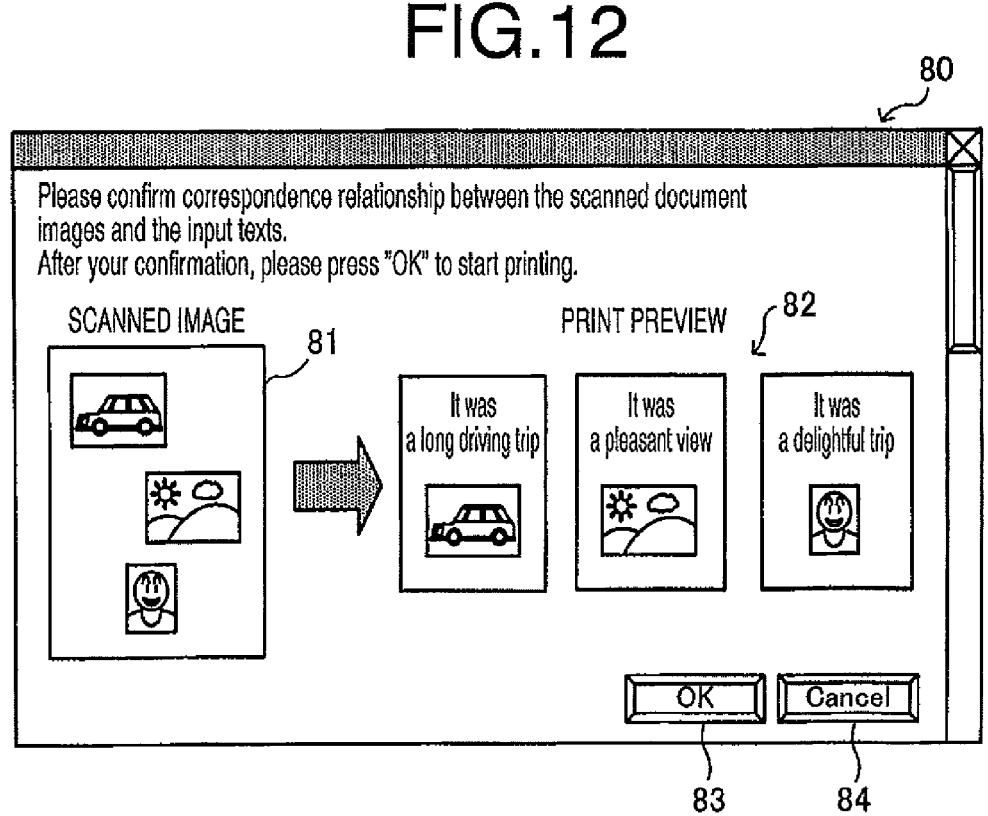

FIG. 12 exemplifies a print preview screen for setting a layout pattern (2) according to one or more aspects of the present invention.

Figure 13:
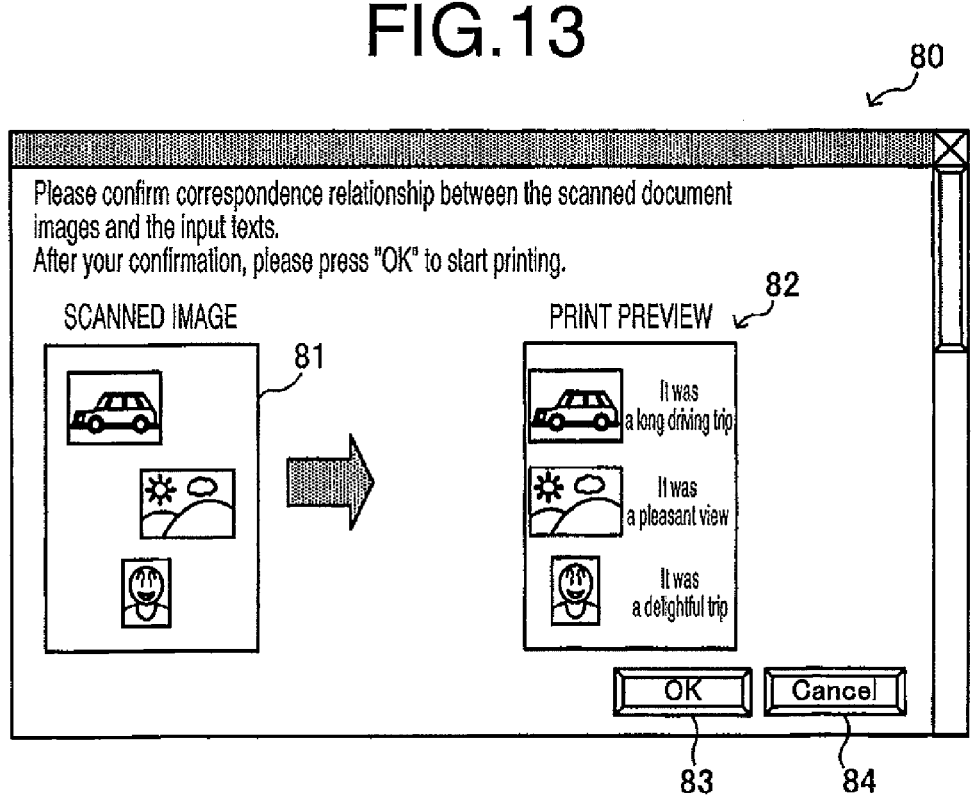

FIG. 13 exemplifies a print preview screen for setting the layout pattern (3) according to one or more aspects of the present invention.

Figure 14:
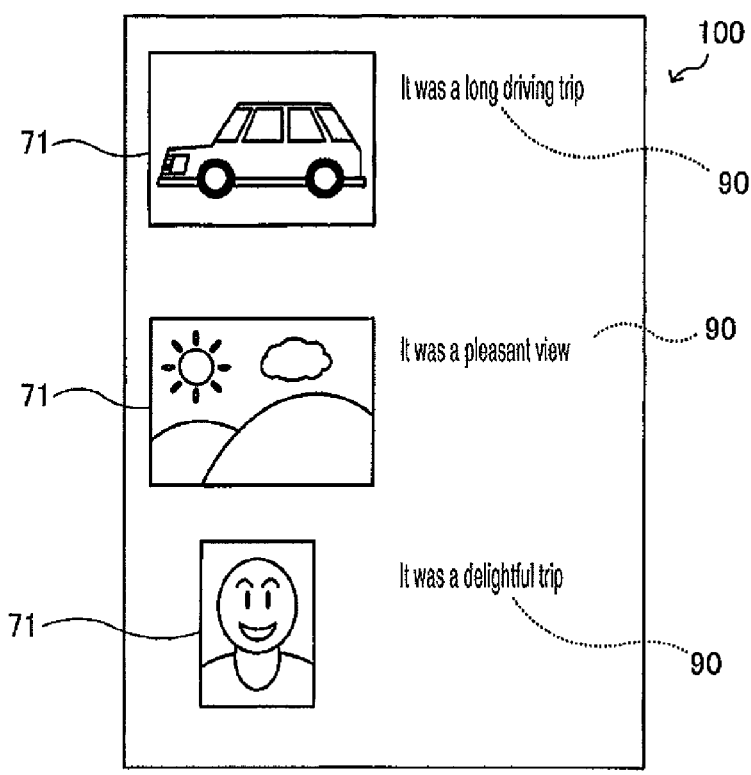

FIG. 14 exemplifies an image printed based on print composite data according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, embodiments according to aspects of the present invention will be described with reference to the accompany drawings.

(First Embodiment)

Figure 1:
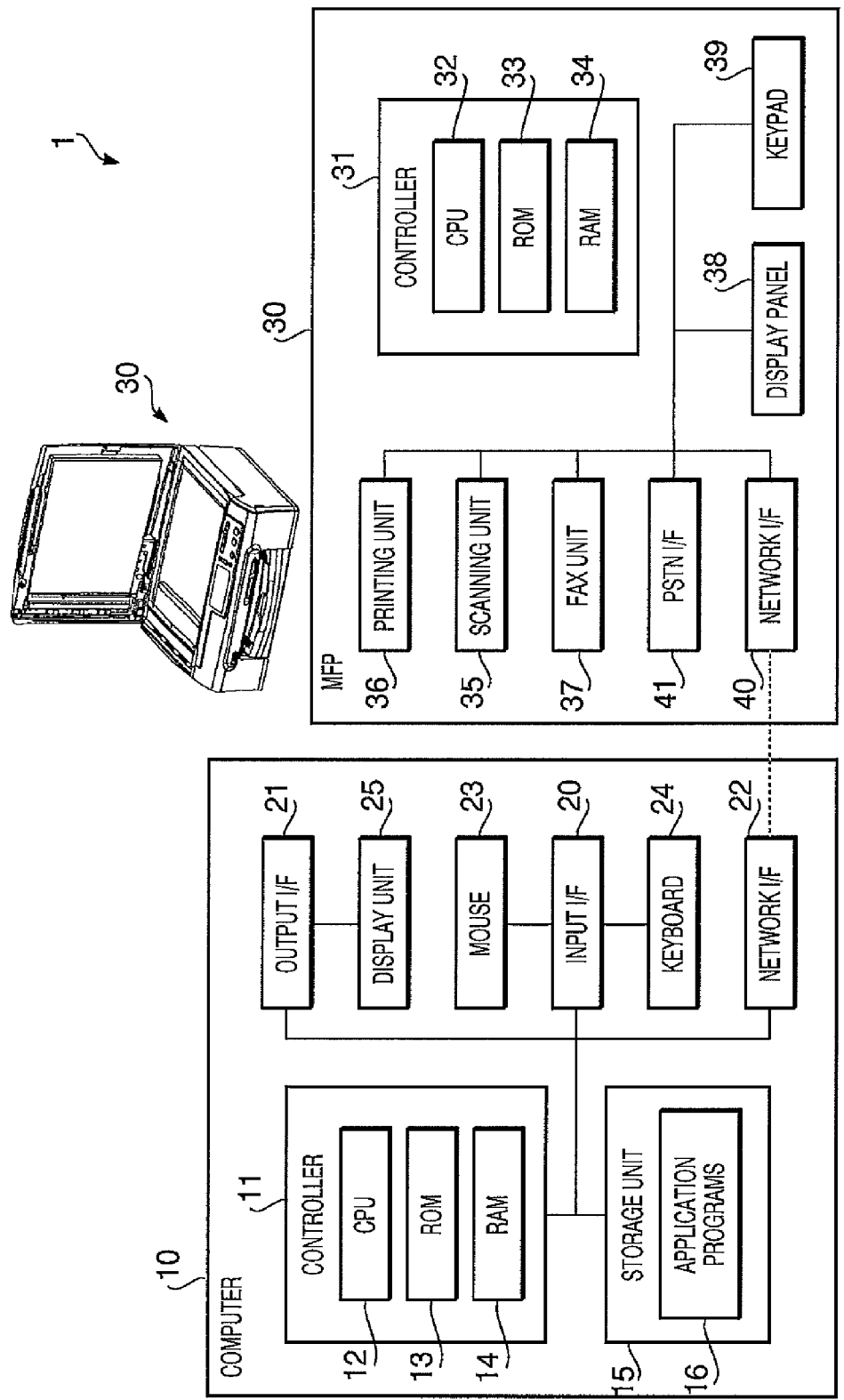

As illustrated in FIG. 1, a printing system 1 of a first embodiment is configured with a computer 10 and a multi-function peripheral (MFP) 30. The computer 10 is connected with the MFP 30 so as to exchange data (e.g., scanned data 70) therebetween.

Initially, a detailed explanation will be provided about a configuration of the computer 10 with reference to FIG. 1. As shown in FIG. 1, the computer 10 includes a controller 11.

The controller 11 is configured with a CPU 12, a ROM 13, and a RAM 14. The CPU 12 is a central processing unit configured to take overall control of the computer 10. The ROM 13 stores data and control programs required for controlling the computer 10. The RAM 14 is configured to temporarily store results of arithmetic operations performed by the CPU 12 using the control programs.

The computer 10 is provided with a storage unit (e.g., an HDD) 15. The storage unit 15 is connected with the controller 11. The storage unit 15 stores application programs 16. The application programs 16 contain a below-mentioned control program (see FIG. 2), a document creating program, and a spread sheet program.

Further, the computer 10 has a mouse 23, a keyboard 24, and a display unit 25. The mouse 23 and the keyboard 24 are linked with the controller 11 via an input interface (I/F) 20. The display unit 25 is connected with the controller 11 via an output I/F 21.

In addition, the computer 10 is provided with a network I/F 22. The computer 10 is connected with the MFP 30 via the network I/F 22.

Subsequently, a detailed explanation will be provided about a configuration of the MFP 30 with reference to FIG. 1. The MFP 30 has a controller 31. The controller 31 is configured with a CPU 32, a ROM 33, and a RAM 34. The CPU 32 is a central processing unit configured to take overall control of the MFP 30. The ROM 33 stores data and programs (e.g., see FIGS. 5-7, and 9-10) required for controlling the MFP 30. The RAM 34 is configured to temporarily store results of arithmetic operations performed by the CPU 32 using the programs.

The MFP 30 is provided with a scanning unit 35, a printing unit 36, and a facsimile unit 37. As can be understood from an external view of the MFP 30 shown in FIG. 1, the scanning unit 35 has a flatbed and a carriage.

The flatbed is configured with optically-transparent material (e.g., glass). The flatbed has such a size that an A3-sized sheet can be placed thereon. Thus, the user can place a plurality of document sheets simultaneously on the flatbed.

The carriage has a light source configured to emit light to a document sheet placed on the flatbed. The light, emitted by the light source of the carriage, is reflected by the document sheet on the flatbed, and used for taking an image with an imaging device. The imaging device has a plurality of image pickup elements (e.g., CCDs), and constitutes the scanning unit 35.

Accordingly, when a plurality of document sheets are placed on the flatbed, the MFP 30 controls the scanning unit 35 to acquire scanned data 70 as shown in FIG. 8. The scanned data 70 contains a plurality of document images 75 based on the document sheets on the flatbed.

The printing unit 36 is configured to print, on a sheet, an image based on input print data under control by the controller 31. Since a detailed configuration of the printing unit 36 has been known, an explanation about the printing unit 36 will be omitted. It is noted that as a printing method of the printing unit 36, various methods may be applied such as an electrophotographic method and an inkjet method.

The facsimile unit 37 is configured to perform facsimile transmission to a predetermined destination device under control by the controller 31. Namely, the facsimile unit 37 is configured to transmit facsimile transmission data as input, to the destination device via a public switched telephone line network. Since a detailed configuration of the facsimile unit 37 has been known, an explanation about the facsimile unit 37 will be omitted.

The MFP 30 is provided with a display panel 38 and a keypad 39. The display panel 38 is configured to display various kinds of information under control by the controller 31. The keypad 39 is used for various operations by the user. Further, the MFP 30 includes a network I/F 40, and a PSTN I/F 41.

Next, a control program of the computer 10 included in the printing system 1 will be set forth with reference to FIG. 2 and other relevant drawings. The control program is executed by the controller 11 of the computer 10.

At this time, a text input screen is displayed on the display unit 25 of the computer 10. The text input screen is the same as a below-mentioned before-scanning preview screen 50, except for not including a document position guide image 51 (which the before-scanning preview screen 50 includes).

Initially, the controller 11 determines whether there is a text (i.e., a character string) input in any of a first text entry field 54A, a second text entry field 54B, and a third text entry field 54C (see FIG. 3) (S1). The text may be input via the mouse 23 or the keyboard 24. When determining that there is a text input in any of the first to third text entry fields 54A to 54C (S1: Yes), the controller 11 goes to S2. Meanwhile, when determining that there is not a text input in any of the first to third text entry fields 54A to 54C (S1: No), the controller 11 goes to S7.

In S2, controller 11 displays a before-scanning preview screen 50 on the display unit 25 (S2). Here, a detailed explanation will be provided about the before-scanning preview screen 50 with reference to FIG. 3.

The before-scanning preview screen 50 includes a document position guide image 51, the first to third text entry fields 54A to 54C, a "Print" button 55, and a layout selection button 56.

The document position guide image 51 is configured with one or more document position images 52 and input text images 53. The document position guide image 51 shows a correspondence relationship and a positional relationship between set positions on the scanning unit 35 where document sheets are placed and texts input in the first to third text entry fields 54A to 54C, in collaboration with a schematic illustration of the MFP 30 included on the before-scanning preview screen 50.

The document position images 52 indicate set positions on the flatbed where document sheets are to be set when document images 71 are acquired from the document sheets with the scanning unit 35. The input text images 53 indicate correspondence relationships and positional relationships between the document images 71 to be acquired later and the texts input in at least one of the first to third text entry fields 54A to 54C.

It is noted that information displayed in the document position guide image 51 is updated in a below-mentioned step S4 in response to data in any of the first to third text entry fields 54A to 54C being updated. Further, when a below-mentioned layout selection process (S10) is performed, the document position images 52 and the input text images 53 are re-displayed in a manner updated in accordance with a layout pattern as set in S10.

The first to third text entry fields 54A to 54C are entry fields in which user-desired texts (character strings) are to be input. The first to third text entry fields 54A to 54C are associated with respective identification numbers. Text data input in each of the first to third text entry field 54A to 54C is associated with the identification number corresponding to the text entry field.

Figure 3:
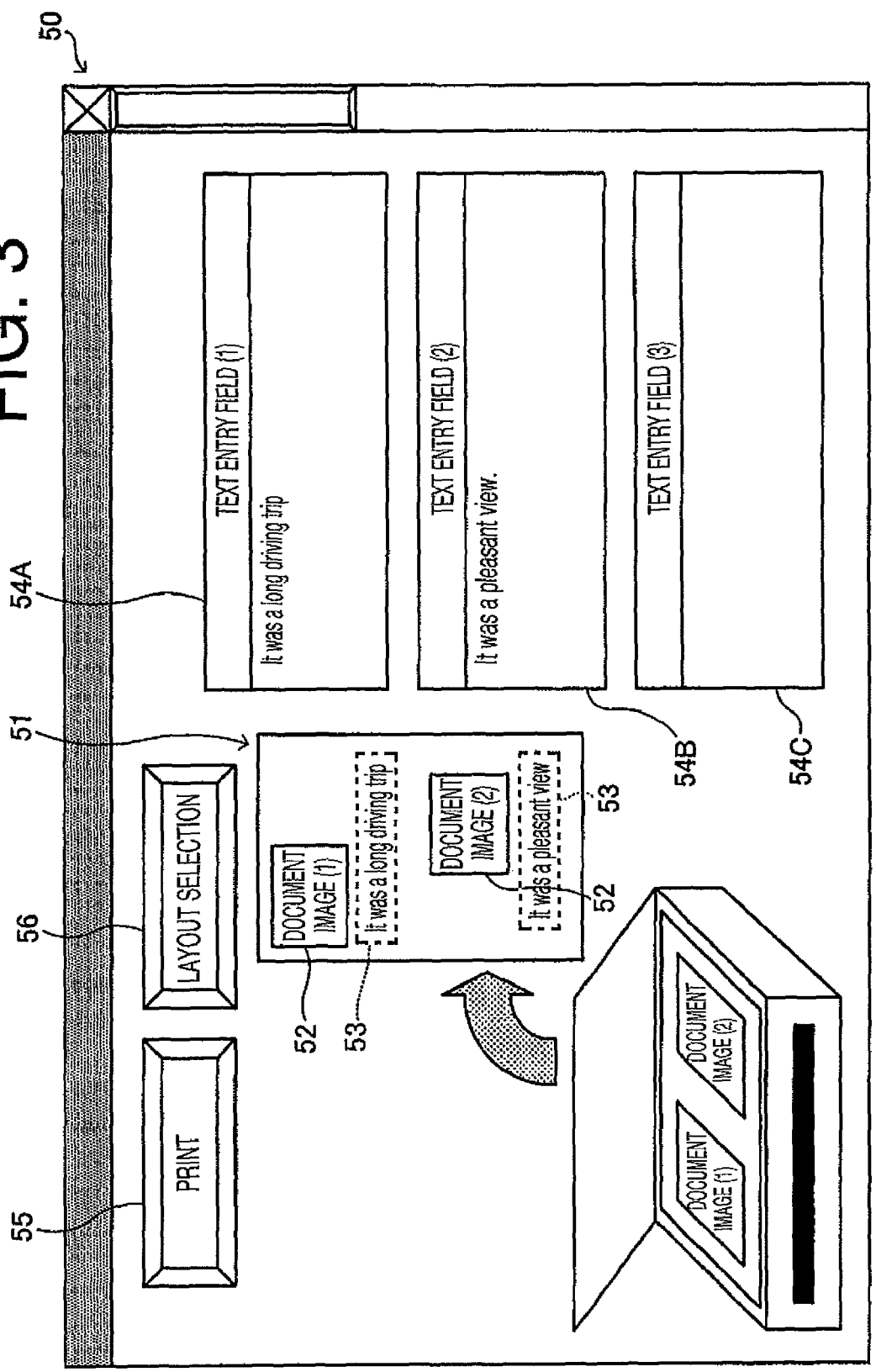

It is noted that although only three text entry fields, i.e., the first to third text entry fields 54A to 54C are shown in FIG. 3, more text entry fields may be included on the before-scanning preview screen 50.

The "Print" button 55 is operated when the user completely inputs all of the texts to be input and thereafter issues an instruction to print out composite data in which the input texts are combined with the document images 71 acquired by the scanning unit 35. The layout selection button 56 is operated when the user selects and sets a layout for the composite data to be output.

Referring back to FIG. 2, after displaying the before-scanning preview screen 50 on the display unit 25, the controller 11 sets a value of a counter n to "1" (S3). A text associated with an identification number identical to the value of the counter n is to be processed in S4.

In S4, based on a text input in a target text entry field, the controller 11 generates an input text image 53 and displays the input text image 53 in a predetermined position in the document position guide image 51 (see FIG. 3) (S4).

Subsequently, the controller 11 increments the value of the counter n by one (S5). Thereby, another text becomes an object to be processed.

Next, the controller 11 determines whether the value of the counter n is more than a total number of texts N (S6). The total number of texts N represents a total number of texts input in the text entry fields. When determining that the value of the counter n is more than the total number of texts N (S6: Yes), the controller 11 goes back to S1. Meanwhile, when determining that the value of the counter n is not more than the total number of texts N (S6: No), the controller 11 goes back to S4.

In S7, the controller 11 determines whether the "Print" button 55 has been operated (S7). When determining that the "Print" button 55 has been operated (S7: Yes), the controller 11 goes to S8. Meanwhile, when determining that the "Print" button 55 has not been operated (S7: No), the controller 11 goes to S9.

In S8, the controller 11 issues a copy command to the MFP 30 via the network I/F 22 (S8). The copy command contains the text data input in each of the text entry fields and layout pattern data set in a below-mentioned layout selection process (S10). In addition, each piece of the text data includes the identification number associated with a corresponding one of the text entry fields.

In S9, the controller 11 determines whether the layout selection button 56 has been operated (S9). When determining that the layout selection button 56 has been operated (S9: Yes), the controller 11 goes to S10. Meanwhile, when determining that the layout selection button 56 has been operated (S9: No), the controller 11 goes back to S1.

In S10, the controller 11 displays the layout selection screen 60 on the display unit 25 to accept a selection and a setting of a user-desired layout.

Figure 4:
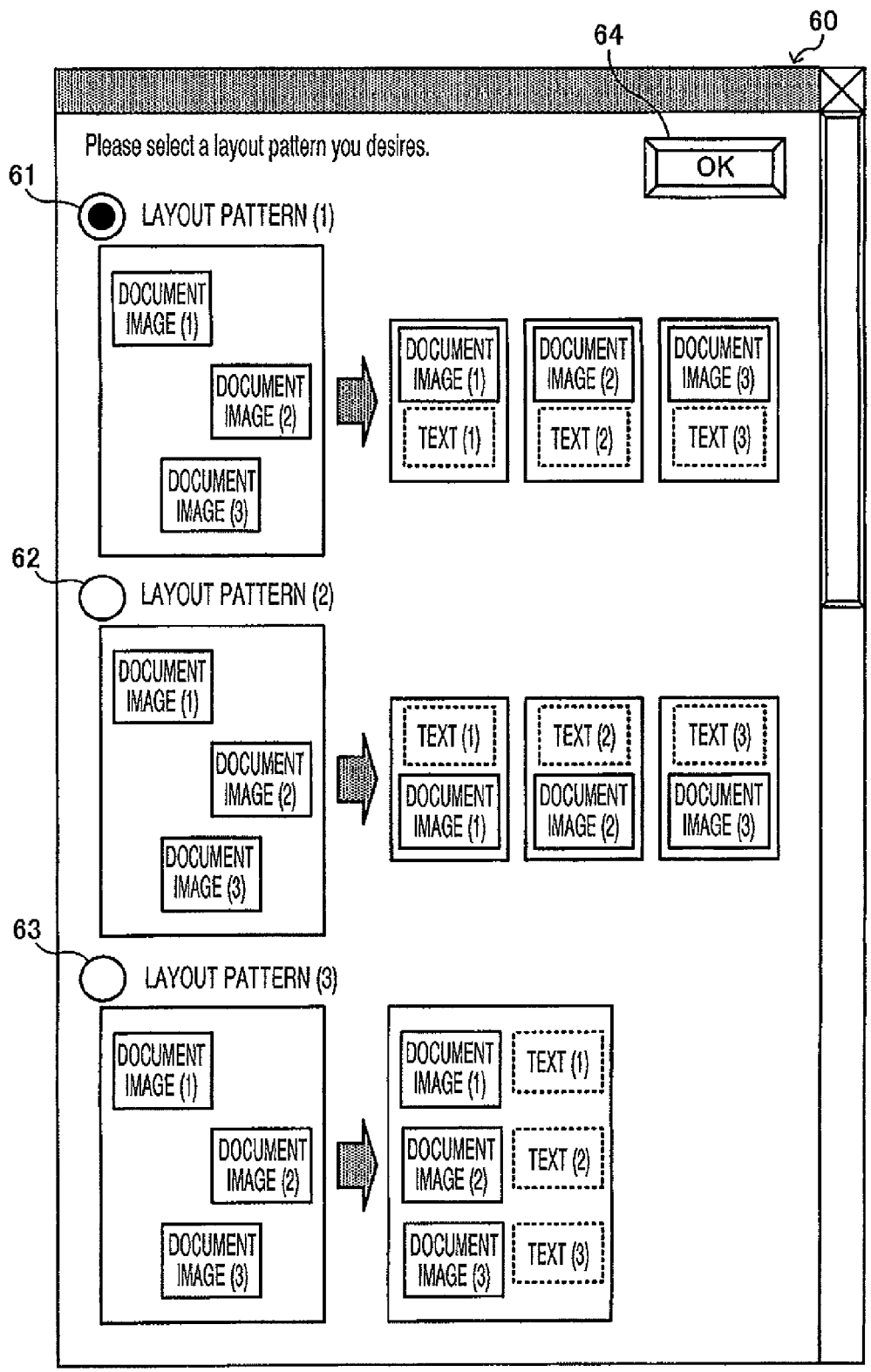

The layout selection screen 60 will be set forth with reference to FIG. 4. As illustrated in FIG. 4, the layout selection screen 60 includes a first selection button 61, a second selection button 62, a third selection button 63, and a selection determining button 64.

The first selection button 61 is used for selecting "a layout pattern (1)." The layout pattern (1) is employed for generating output data in which each page of data contains a combination of a document image 71 and an ancillary text image 90 based on an input text (see FIG. 11). In this case, each ancillary text image 90 is placed beneath a corresponding document image 71.

The second selection button 62 is used for selecting "a layout pattern (2)." The layout pattern (2) is employed for generating output data in which each page of data contains a combination of a document image 71 and an ancillary text image 90 based on an input text (see FIG. 12). In this case, each ancillary text image 90 is placed above a corresponding document image 71.

The third selection button 63 is used for selecting "a layout pattern (3)." The layout pattern (3) is employed for generating output data in which each page of data contains three combinations each of which includes a document image 71 and an ancillary text image 90 based on an input text (see FIG. 13). In this case, each ancillary text image 90 is placed on a right side of a corresponding document image 71.

The selection determining button 64 is used for determining a selection among the first to third selection buttons 61 to 63 and setting a selected layout pattern.

Accordingly, in S10, the user selects a desired layout pattern through one of the first to third selection buttons 61 to 63, and sets the desired layout pattern through the selection determining button 64. The controller 11 terminates the layout selection process in response to the selection determining button 64 being operated.

Again referring back to FIG. 2, S11 and the steps following S11 will be set forth. In S11, the controller 11 determines whether the computer 10 has received preview data from the MFP 30 (S11). The preview data contains the scanned data 70 generated by the MFP 30 and print composite data that includes the document images 71 and the ancillary text images 90. When determining that the computer 10 has received the preview data from the MFP 30 (S11: Yes), the controller 11 goes to S12. Meanwhile, when determining that the computer 10 has not received the preview data from the MFP 30 (S11: No), the controller 11 remains in a standby state while waiting the preview data to be received.

In S12, the controller 11 displays on the display unit 25 a print preview screen 80 on the basis of the preview data.

The print preview screen 80 will be described in detail with reference to FIGS. 11 to 13. As shown in FIGS. 11 to 13, the print preview screen 80 includes a scanned image 81, one or more preview images 82, an "OK" button 83, and a "Cancel" button 84.

The scanned image 81 is an image based on the scanned data 70 acquired by the scanning unit 35 of the MFP 30. The scanned image 81 shows images of document sheets set on the flatbed of the scanning unit 35.

The preview images 82 are images based on the print composite data contained in the preview data. As will be described below, the print composite data is image data in which one or more combinations, each of which includes a document image 71 and an ancillary text image 90, are combined in accordance with a set layout pattern. Thus, as illustrated in FIGS. 11 to 13, what is displayed as the preview images 82 varies depending on which layout pattern is set.

The "OK" button 83 is used to perform a printing operation on one or more print sheets 100 in accordance with the preview images 82 (i.e., the print composite data). The "Cancel" button 84 is used for canceling a print job according to the preview images 82.

Again referring back to FIG. 2, S13 and the steps following S13 will be set forth. In S13, the controller 11 determines whether the "OK" button 83 has been operated (S13). When determining that the "OK" button 83 has been operated (S13: Yes), the controller 11 goes to S14. Meanwhile, when determining that the "OK" button 83 has not been operated (S13: No), the controller 11 goes to S15.

In S14, the controller 11 transmits a print command to the MFP 30 via the network I/F 22 (S14). Then the controller 11 terminates the control program. The print command is a command that instructs the MFP 30 to perform a printing operation based on the print composite data.

In S15, the controller 11 determines whether the "Cancel" button 84 has been operated (S15). When determining that the "Cancel" button 84 has been operated (S15: Yes), the controller 11 advances to S16. Meanwhile, when determining that the "Cancel" button 84 has not been operated (S15: No), the controller 11 goes back to S13.

In S16, the controller 11 transmits a cancel command to the MFP 30 via the network I/F 22 (S16). Then, the controller 11 terminates the control program. The cancel command is a command for canceling a print job based on the print composite data.

Figure 5:
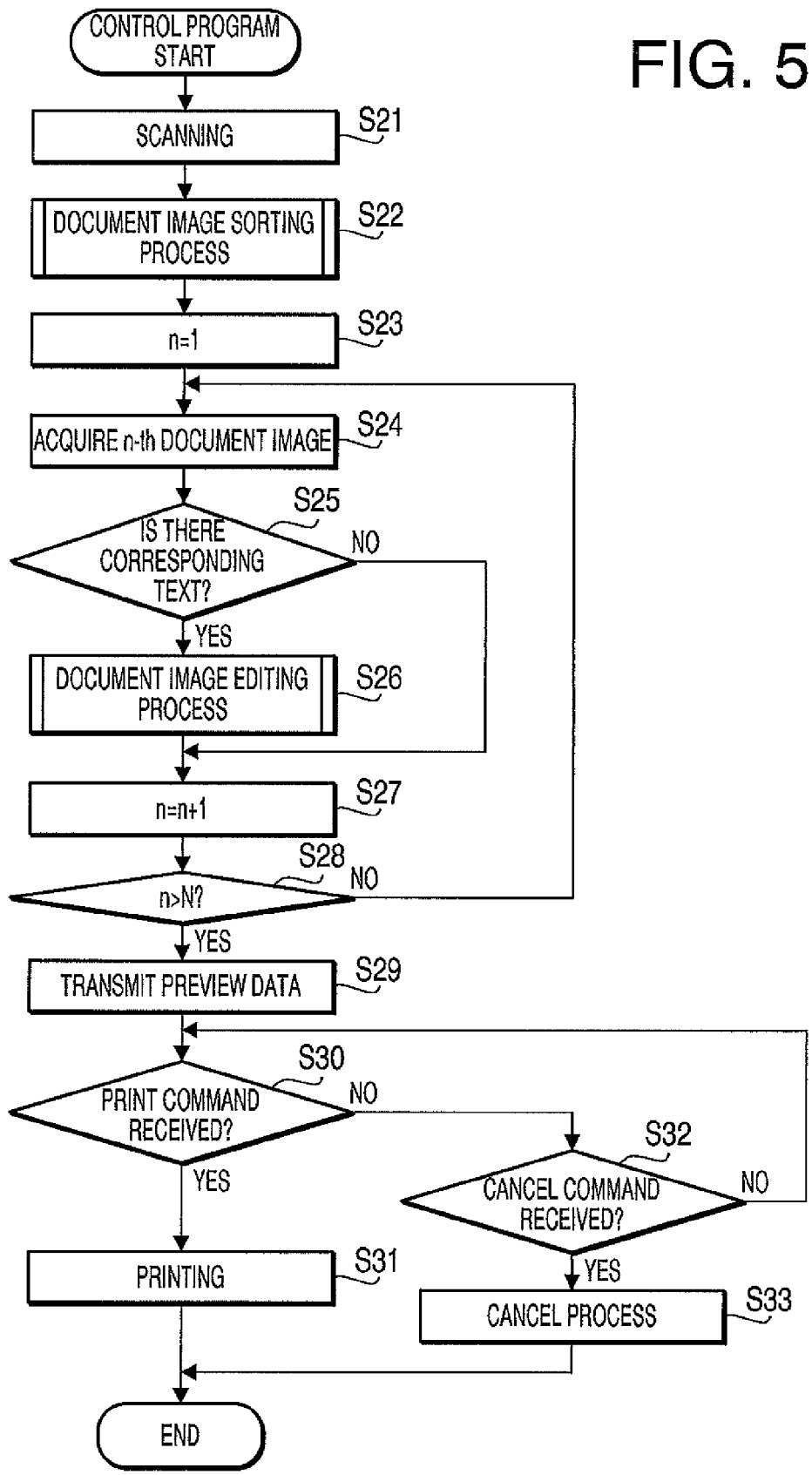
FIG. 5 is a flowchart showing a procedure of a control program to be executed by a multi-function peripheral (MFP) according to one or more aspects of the present invention.

Next, a detailed explanation will be provided about a control program of the MFP 30 included in the printing system 1 with reference to FIG. 5. The control program of the MFP 30 is executed by the controller 31.

It is noted that the following description will be provided under an assumption that the MFP 30 has received the copy command (containing text data and layout pattern data) transmitted by the computer 10 in the aforementioned step S8.

In addition, the flatbed of the MFP 30 has a plurality of user-desired document sheets set in the respective set positions thereon. At this time, the user sets the plurality of document sheets based on the document position guide image 51 on the before-scanning preview screen 50.

In S21, the controller 31 perform auto-crop scanning based on the received copy command (S21).

To describe more specifically, in S21, the controller 31 controls the scanning unit 35 to generate the scanned data 70 that contains the document images 71 based on the document sheets set in the respective set positions (see FIG. 8). The scanned data 70 has a size defined with a scanned-image height H and a scanned-image width W. The scanned data 70, which constitutes the preview data, is stored on the RAM 34.

Thereafter, the controller 31 detects, from the scanned data 70 as generated, the document images 71 based on the document sheets by performing edge detection. Then, the controller 31 extracts the document images 71 and stores each of the extracted document images 71 separately onto the RAM 34. At this time, the controller 31 sequentially provides the document images 71 with respective detection number in the order in which the document images 71 have been extracted from the scanned data 70. It is noted that the detection numbers are based on a concept different from that of below-mentioned identification numbers.

Then, the controller 31 sets an orthogonal coordinate system on the scanned data 70 and acquires positional coordinate information of each of the document images 71. Specifically, the controller 31 sets a position of a pixel at a left upper end of the scanned data 70 as an origin O (see FIG. 8). Further, the controller 31 sets a line extending in a width direction of the scanned data 70 via the origin O as a horizontal axis (an X-axis) and a line extending in a height direction of the scanned data 70 via the origin O as a vertical axis (a Y-axis) (see FIG. 8).

After that, the controller 31 identifies a left upper point of each of the document images 71 as an image reference point I. Then, the controller 31 acquires positional coordinate information that represents a position of the image reference point I with respect to the orthogonal coordinate system. The controller 31 terminates the auto-crop scanning after completing acquisition of the position coordinate information of each of the document images 71.

In S22, the controller 31 performs a document image sorting process (S22). In the document image sorting process (S22), the controller 31 executes a document image sorting program.

Figure 6:
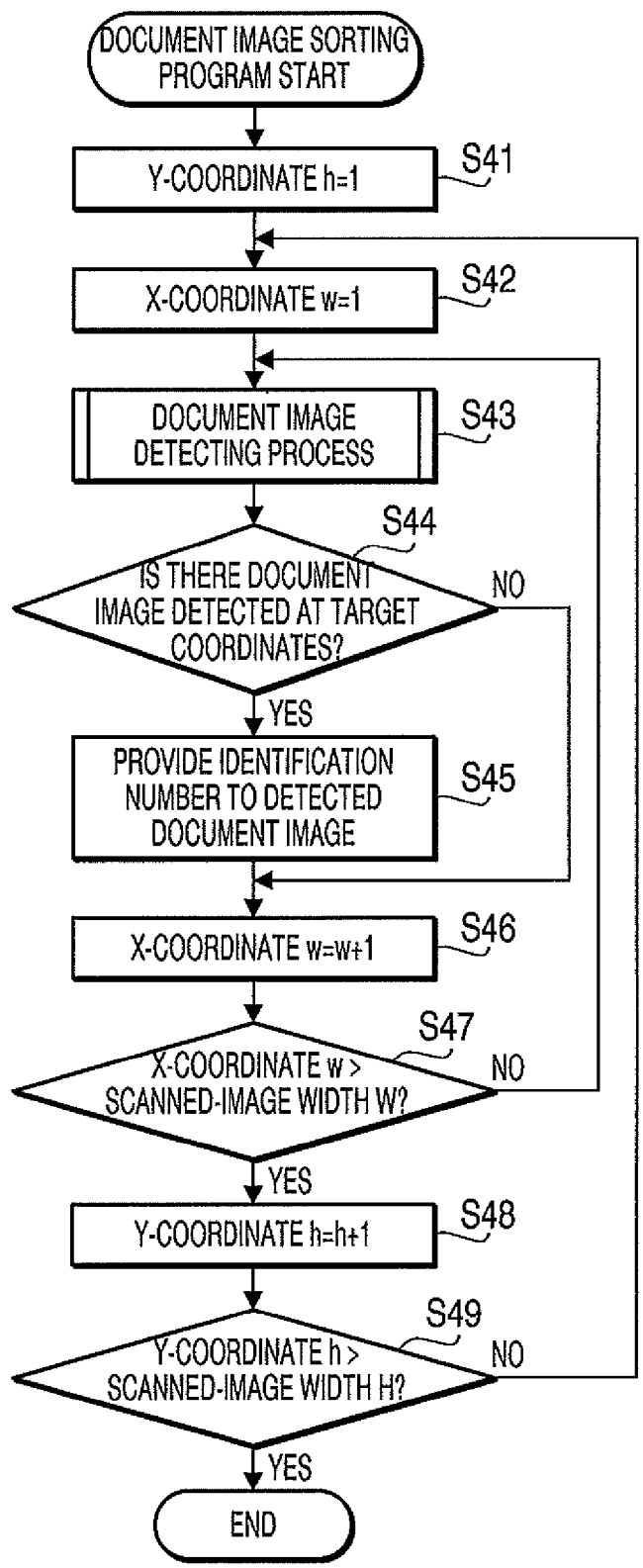
FIG. 6 is a flowchart showing a procedure of a document image sorting program according to one or more aspects of the present invention.

The document image sorting program will be described in detail with reference to FIG. 6. In the document image sorting process, the controller 31 first sets a Y-coordinate h of target coordinates to "1" (S41). The target coordinates denote coordinates at which the controller 31 attempts to detect existence of a document image 71.

In S42, the controller 31 sets an X-coordinate w of the target coordinates to "1" (S42).

In S43, the controller 31 performs a document image detecting process (S43). In the document image detecting process (S43), the controller 31 executes a document image detecting program.

Figure 7:
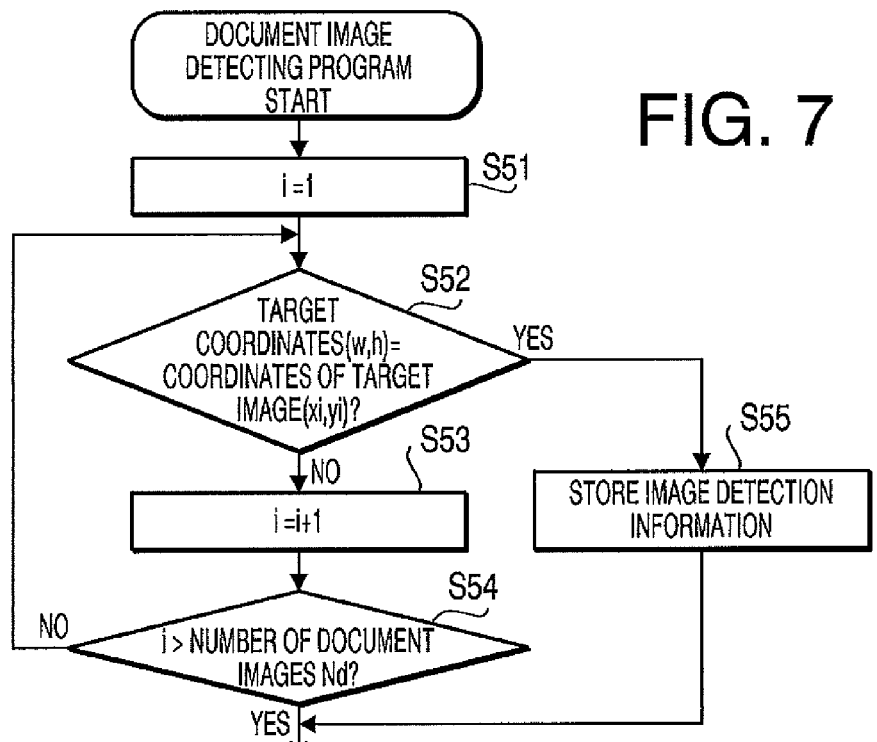
FIG. 7 is a flowchart showing a procedure of a document image detecting program according to one or more aspects of the present invention.

The document image detecting program will be described in detail with reference to FIG. 7. In the document image detecting process (S43), the controller 31 first sets a value of a counter i to "1" (S51). The value of the counter i is associated with the detection number of each of the document images 71 so as to indicate a document image 71 to be examined in the subsequent step S52.

In S52, the controller 31 determines whether the target coordinates are identical to coordinates of a target image, based on the positional coordinate information of the target image (S52). When determining that the target coordinates are identical to the coordinates of the target image (S52: Yes), the controller 31 goes to S55. Meanwhile, when determining that the target coordinates are not identical to the coordinates of the target image (S52: No), the controller 31 goes to S53. It is noted that the target image denotes a document image 71 identified with the value of the counter i.

In S53, the controller 31 increments the value of the counter i by one (S53). Namely, the controller 31 sets a document image 71 of a next detection number as a target image.

In S54, the controller 31 determines whether the value of the counter i is more than the number of the document images Nd (S54). The number of the document images Nd, which is a total number of the document images 71 contained in the scanned data 70, is acquired in S21 as the maximum one of the detection numbers. When determining that the valve of the counter i is more than the number of the document image Nd (S54: Yes), the controller 31 terminates the document image detecting program and then goes to S44. Meanwhile, when determining that the value of the counter i is not more than the number of the document images Nd (S54: No), the controller 31 goes back to S52 to perform the document image detection for a new target image.

In S55, in response to determining that the target coordinates are identical to the coordinates of the target image (S52: Yes), the controller 31 stores image detection information onto the RAM 34 (S55).

Again referring back to FIG. 6, an explanation will be provided about S44 and the steps following S44 in the document image sorting program. In S44, the controller 31 determines whether there is a document image 71 detected at the target coordinates, based on existence/nonexistence of the aforementioned image detection information (S44). When determining that there is a document image 71 detected at the target coordinates (S44: Yes), the controller 31 goes to S45. Meanwhile, when determining that there is not a document image 71 detected at the target coordinates (S44: No), the controller 31 goes to S46.

In S45, the controller 31 provides the detected document image 71 with an identification number (S45). Specifically, the controller 31 sequentially provides each detected document image 71 in the detected order with an identification number beginning with "1".

In S46, the controller 31 increments the X-coordinate w of the target coordinates by one so as to shift the target coordinates by one in the X-axis direction (S46).

In S47, the controller 31 determines whether the X-coordinate of the target coordinates is more than the scanned-image width W (i.e., the maximum value of the X-coordinate) (S47). Namely, the controller 31 determines whether the document image detection is performed for all pixels of a single horizontal line. When determining that the X-coordinate of the target coordinates is more than the scanned-image width W (S47: Yes), the controller 31 goes to S48. Meanwhile, when determining that the X-coordinate of the target coordinates is not more than the scanned-image width W (S47: No), the controller 31 goes to S44.

In S48, the controller 31 increments the Y-coordinate h of the target coordinates by one so as to shift the target coordinates by one in the Y-axis direction (S48).

In S49, the controller 31 determines whether the Y-coordinate h of the target coordinates is more than the scanned-image height H (i.e., the maximum value of the Y-coordinate) (S49). Namely, the controller 31 determines whether the document image detection is performed for all pixels of the scanned data 70. When determining that the Y-coordinate h of the target coordinates is more than the scanned-image height H (S49: Yes), the controller 31 terminates the document image sorting program. Then, the controller 31 goes to S23. Meanwhile, when determining that the Y-coordinate h of the target coordinates is not more than the scanned-image height H (S49: No), the controller 31 goes back to S42.

Again referring back to FIG. 5, an explanation will be provided about S23 and the steps following S23 in the control program of the MFP 30. In S23, the controller 31 sets the value of the counter n to "1" (S23). In this case, the value of the counter n is associated with the identification number for identifying each text and each document image 71.

In S24, the controller 31 acquires, from the RAM 34, a document image 71 provided with an identification number identical to the value of the counter n, and sets the acquired document image 71 as an edit target image (S24). The edit target image denotes a document image 71 to be processed in a below-mentioned document image editing process (S26).

In S25, the controller 31 determines whether there is a corresponding text in the text data received along with the copy command (S25). The corresponding text denotes text data provided with the identification number identical to the value of the counter n. When determining that there is a corresponding text in the text data received along with the copy command (S25: Yes), the controller 31 goes to S26. Meanwhile, when determining that there is not a corresponding text in the text data received along with the copy command (S25: No), the controller 31 goes to S27.

In S26, the controller 31 performs a document image editing process (S26). In the document image editing process (S26), the controller 31 performs a document image editing program.

The document image editing program will be described in detail with reference to FIG. 9.

In the document image editing process (S26), the controller 31 initially determines whether a currently-set layout is of "the layout pattern (1)," based on the received layout pattern data (S61). When determining that the currently-set layout is of "the layout pattern (1)" (S61: Yes), the controller 31 goes to S62. Meanwhile, when determining that the currently-set layout is not of "the layout pattern (1)" (S61: No), the controller 31 goes to S65.

In S62, the controller 31 sets a print data number M to the value of the counter n (i.e., the identification number for the edit target image and the corresponding text) (S62). The print data number M is a number for the print composite data, and corresponds to a page number of the print composite data at the time when printed out.

In S63, the controller 31 allocates and combines the edit target image in an upper portion of the print composite data (S63).

In S64, the controller 31 allocates an ancillary text image 90 based on the corresponding text in a lower portion of the print composite data (S64). Thereafter, the controller 31 terminates the image editing program and goes to S27.

In S65, the controller 31 determines whether the currently-set layout is of "the layout pattern (2)," based on the received layout pattern data (S65). When determining that the currently-set layout is of "the layout pattern (2)" (S65: Yes), the controller 31 goes to S66. Meanwhile, when determining that the currently-set layout is not of "the layout pattern (2)" (S65: No), the controller 31 goes to S69.

In S66, the controller 31 sets the print data number M to the value of the counter n (S66).

In S67, the controller 31 allocates and combines the edit target image in a lower portion of the print composite data (S67).

In S68, the controller 31 allocates the ancillary text image 90 based on the corresponding text in an upper portion of the print composite data (S68). After that, the controller 31 terminates the image editing program, and then goes to S27.

In S69, the controller 31 performs an image-text allocating process based on "the layout pattern (3)" currently set (S69), by running an image-text allocating program shown in FIG. 10.

A detailed explanation will be provided about the image-text allocating program to be executed by the controller 31 in S69, with reference to FIG. 10.

In S81, the controller 31 determines whether a remainder left when the value of the counter n is divided by three is equal to one (S81). When determining that the remainder left when the value of the counter n is divided by three is equal to one (S81: Yes), the controller 31 goes to S82. Meanwhile, when determining that the remainder left when the value of the counter n is divided by three is not equal to one (S81: No), the controller 31 goes to S86.

In S82, the controller 31 determines whether the value of the counter n is equal to one (S82). When determining that the value of the counter n is equal to one (S82: Yes), the controller 31 goes to S83. Meanwhile, when determining that the value of the counter n is not equal to one (S82: No), the controller 31 goes to S84.

In S83, the controller 31 sets the print data number to one (S83).

In S84, the controller 31 allocates and combines the edit target image in a left upper portion of the print composite data (S84).

In S85, the controller 31 allocates the ancillary text image 90 based on the corresponding text in a right upper portion of the print composite data (S85). Thereafter, the controller 31 terminates the image-text allocating program and the image editing program. Then the controller 31 goes to S27.

In S86, the controller 31 determines whether a remainder left when the value of the counter n is divided by three is equal to two (S86). When determining that the remainder left when the value of the counter n is divided by three is equal to two (S86: Yes), the controller 31 goes to S87. Meanwhile, when determining that the remainder left when the value of the counter n is divided by three is not equal to two (S86: No), the controller 31 goes to S89.

In S87, the controller 31 allocates and combines the edit target image in a left middle portion of the print composite data (S87).

In S88, the controller 31 allocates the ancillary text image 90 based on the corresponding text in a right middle portion of the print composite data (S88).

In S89, the controller 31 allocates and combines the edit target image in a left lower portion of the print composite data (S89).

In S90, the controller 31 allocates the ancillary text image based on the corresponding text in a right lower portion of the print composite data (S90).

In S91, the controller 31 increments the print data number M by one (S91). Thereafter, the controller 31 terminates the image-text allocating program and the image editing program, and then goes to S27.

Again referring back to FIG. 5, an explanation will be provided about S27 and the steps following S27 in the control program of the MFP 30. In S27, the controller 31 increments the value of the counter n by one so as to change a text and a document image 71 to be processed (S27).

In S28, the controller 31 determines whether the value of the counter n is more than the number of the document images N (S28). Namely, the controller 31 determines whether the document image editing process has been performed for all of the document images 71. When determining that the value of the counter n is more than the number of the document images N (S28: Yes), the controller 31 reads to S29. Meanwhile determining that the value of the counter n is not more than the number of the document images N (S28: No), the controller 31 goes back to S24.

In S29, the controller 31 reads, out of the RAM 34, the scanned data 70 and the print composite data generated in S26, and transmits the read data (i.e., the scanned data 70 and the print composite data) as the preview data via the network I/F 40 (S29).

In S30, the controller 31 determines whether the print command has been received from the computer 10 via the network I/F 40 (S30). When determining that the print command has been received from the computer 10 (S30: Yes), the controller 31 goes to S31. Meanwhile, when determining that the print command has not been received from the computer 10 (S30: No), the controller 31 goes to S32.

In S31, the controller 31 performs a printing operation on one or more print sheets 100 based on the print composite data (see FIG. 14) (S31). After completing the printing operation, the controller 31 terminates the control program.

In S32, the controller 31 determines whether the cancel command has been received from the computer 10 via the network I/F 40 (S32). When determining that the cancel command has been received from the computer 10 (S32: Yes), the controller 31 goes to S33. Meanwhile, when determining that the cancel command has not been received from the computer 10 (S32: No), the controller 31 goes back to S30.

In S33, the controller 31 performs a cancel process, in which the controller 31 deletes the print composite data from the RAM 34 (S33). Thereafter, the controller 31 terminates the control program of the MFP 30.

As described hereinabove, in the first embodiment, the printing system 1 and the control programs (see FIGS. 2, 5-7, and 9-10) extracts each of the document images 71 from the scanned data 70 that contains respective document images 71 based on a plurality of document sheets (S21). According to the printing system 1, the user can input one or more desired texts in the first to third entry fields 54A to 54C (S1). Further, the printing system 1 associates each of the document images 71 with a corresponding one of the input texts based on the respective identification numbers of the document images 71 and the input texts, and generates the print composite data (S23 to S26). The print composite data contains one or more pages of data, and each page of data contains one or more (three) combinations each of which includes a document image 71 and an ancillary text image 90 as a unit. The print composite data generated is printed on one or more print sheets 100 on a page-by-page basis (S31) (see FIG. 14).

Consequently, the printing system 1 can present output data in which each of the document images 71 of a plurality of document sheets is accompanied by a corresponding ancillary text image 90 by performing a single scanning operation. Namely, the printing system 1 needs not perform a scanning operation for each document sheet, and thus presents high user-friendliness as making it possible to reduce a burden placed on a user who attempts to acquire such output data.

Further, the printing system 1 displays the before-scanning preview screen 50 on the display unit 25 before scanning the document sheets with the scanning unit 35 (S2). The before-scanning preview screen 50 includes the document position guide image 51.

By displaying the document position guide image 51 on the before-scanning preview screen 50, the printing system 1 can inform of the respective set positions of the document sheets to be set on the flatbed of the scanning unit 35. Thereby, the user can set the document sheets to associate the document images 71 with the ancillary text images 90 in a user-desired fashion. Accordingly, the printing system 1 can certainly provide the user with output data in which the document images 71 and the ancillary text images 90 are allocated in user-desired association with each other.

The printing system 1 displays the print preview screen 80 on the display unit 25 after acquiring the scanned data 70 that contains a plurality of document images 71 (S12). The print preview screen 80 contains one or more preview images 82 based on the print composite data.

Therefore, by informing the user of the preview images 82 shown in the same manner as actual printed images, the printing system 1 can more certainly present user-desired output data. Further, as accepting, at this moment, any of the command for performing a printing operation and the command for canceling a print job, the printing system 1 can prevent the user from performing an unnecessary printing operation and provide the user with user-desired output data.

Furthermore, the printing system 1 displays on the display unit 25 the layout selection screen 60, which makes it possible to present output data based on a user-desired layout pattern. By making a selection among "the layout pattern (1)," "the layout pattern (2)," "the layout pattern (3)," the user can change the position of a corresponding ancillary text image 90 relative to a document image 71, and the number of the combinations, each of which includes a document image 71 and an ancillary text image 90, which are contained in the print composite data (see FIGS. 9 and 10). Thus, the printing system 1 can more certainly present outputs (images) printed in a user-desired fashion.

(Second Embodiment)

Subsequently, an explanation will be provided about a second embodiment, in which one or more aspects of the present invention are applied to an MFP 30. A basic configuration of the MFP 30 in the second embodiment is the same as that of the MFP 30 in the first embodiment. Therefore, differences between the first and second embodiments will be set forth below.

Figure 2:
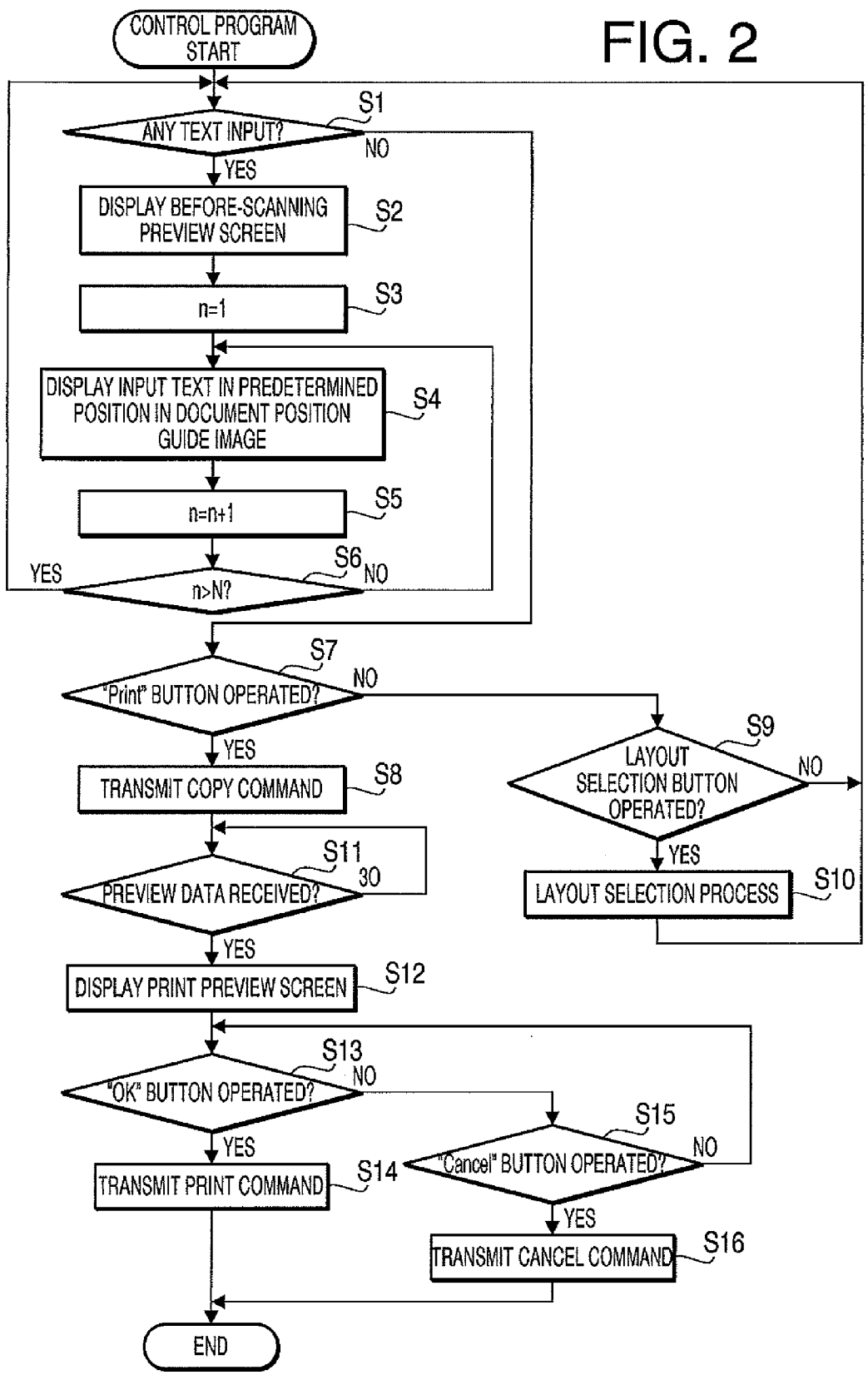

In the second embodiment, the control program shown in FIG. 2 is stored on a storage unit (e.g., the ROM 33) of the MFP 30, and executed by the controller 31 of the MFP 30.

Further, the second embodiment is different from the first embodiment in operations of the steps S2, S4, S8, S10, S11, and S13 to S16 of the control program shown in FIG. 2 and the steps S29 to S33 of the control program shown in FIG. 5. The operations of the other steps in the second embodiment are the same as those in the first embodiment. Next, the differences between the first and the second embodiments will be described.

In the second embodiment, the before-scanning preview screen 50 in S2 and S4, the layout selection screen 60 in S10, and the print preview screen 80 in S12 are displayed on not the display unit 25 but the display panel 38. Except for the difference as to whether the above screens 50, 60, and 80 are displayed on the display unit 25 or the display panel 38, the other operations of S2, S4, S10, and S12 in the second embodiment are the same as those in the first embodiment.

In the second embodiment, the operations of S8, S11, S13 to S16, and S29 to S33 are executed within the MFP 30 without any communication with an external device such as the computer 10 in the first embodiment. Except for the difference as to whether communication is performed with an external device, the other operations of S8, S11, S13 to S16, and S29 to S33 in the second embodiment are the same as those in the first embodiment.

Further, in the second embodiment, the control program shown in FIG. 5 is launched in response to the "Print" button 55 being operated, e.g., through the keypad 39.

Thus, the MFP 30 and the control programs configured as above in the second embodiment can provide the same effects as the printing system 1 and the control programs in the first embodiment. Namely, the MFP 30 and the control programs in the second embodiment can present high user-friendliness to reduce a user's burden in obtaining a printed output in which a user-desired ancillary image is combined with each of one or more document images. Further the MFP 30 and the control programs in the second embodiment can certainly provide the user with a printed output in which a plurality of images are allocated in accordance with user-desired correspondence and positional relationships therebetween.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only exemplary embodiments of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are possible.

In the aforementioned embodiments, the print composite data is generated with an ancillary text image 90 based on a text input by the user being associated with each of the document images 71. However, various kinds of image data may be associated with the document images 71.

In the aforementioned embodiments, three types of layout patterns are settable in the layout selection process (S10). However, any other layout pattern may be settable in the layout selection process. Namely, an ancillary text image 90 may be allocated relative to a corresponding document image 71 so as to establish any of various kinds of positional relationships between the ancillary text image 90 and the document image 71. Furthermore, the number of the combinations, each of which includes a document image 71 and an ancillary text image 90, contained in each page of data in the print composite data is not limited to one or three, and may be changed as needed.

What is claimed is:

1. An image processing device configured to generate and output composite data in which two or more images are combined, comprising:
    an image acquiring unit configured to acquire image data of one or more document sheets in a single acquiring operation;
    an image extracting unit configured to extract, from the acquired image data, document images respectively based on the document sheets;
    an image position specifying unit configured to specify a position of each of the extracted document images which position is defined on the acquired image data;
    a first identification providing unit configured to provide each of the document images with a first identification for identifying the document image, based on the specified positions of the document images;
    an input unit configured to input data for creating one or more ancillary images;
    a second identification providing unit configured to provide each of the ancillary images created based on the input data with a second identification for identifying the ancillary image;
    an ancillary image identifying unit configured to identify one of the ancillary images as being associated with one of the document images, based on the first and second identifications;
    a composite data generating unit configured to generate one or more pages of composite data, each page of the composite data containing one or more combinations each of which includes one of the document images and an ancillary image identified by the ancillary image identifying unit as being associated with the one of the document images; and
    an output unit configured to output each page of the composite data generated by the composite data generating unit.

2. The image processing device according to claim 1, further comprising an output preview unit configured to, in advance of outputting the composite data, preview a positional relationship between the document image and the ancillary image in each of the combinations contained on each page of the composite data.

3. The image processing device according to claim 1, further comprising an acquisition preview unit configured to, in advance of acquiring the image data of the document sheets, preview set positions where the document sheets are to be set on the image acquiring unit and a correspondence relationship between the document sheets and the ancillary images based on the input data.

4. The image processing device according to claim 1, further comprising a positional relationship changing unit configured to change a positional relationship between the document image and the ancillary image in each of the combinations contained on each page of the composite data.

5. The image processing device according to claim 4, wherein the positional relationship changing unit is configured to select and set one of predetermined layout patterns that define respective positional relationships between the document image and the ancillary image in each of the combinations contained on each page of the composite data.

6. The image processing device according to claim 4, wherein the positional relationship changing unit is configured to change a total number of the combinations contained on each page of the composite data.

7. An image processing system configured to generate and output composite data in which two or more images are combined, comprising:
    an image acquiring unit configured to acquire image data of one or more document sheets in a single acquiring operation;
    an image extracting unit configured to extract, from the acquired image data, document images respectively based on the document sheets;
    an image position specifying unit configured to specify a position of each of the extracted document images which position is defined on the acquired image data;
    a first identification providing unit configured to provide each of the document images with a first identification for identifying the document image, based on the specified positions of the document images;
    an input unit configured to input data for creating one or more ancillary images;
    a second identification providing unit configured to provide each of the ancillary images created based on the input data with a second identification for identifying the ancillary image;
    an ancillary image identifying unit configured to identify one of the ancillary images as being associated with one of the document images, based on the first and second identifications;
    a composite data generating unit configured to generate one or more pages of composite data, each page of the composite data containing one or more combinations each of which includes one of the document images and an ancillary image identified by the ancillary image identifying unit as being associated with the one of the document images; and
    an output unit configured to output each page of the composite data generated by the composite data generating unit.

8. A non-transitory computer readable medium storing computer readable instructions that cause a processor, which comprises an image acquiring unit, perform:

an image acquiring step of acquiring image data of one or more document sheets set on the image acquiring unit, in a single acquiring operation;

an image extracting step of extracting, from the acquired image data, document images respectively based on the document sheets;

an image position specifying step of specifying a position of each of the extracted document images which position is defined on the acquired image data;

a first identification providing step of providing each of the document images with a first identification for identifying the document image, based on the specified positions of the document images;

an input step of inputting data for creating one or more ancillary images;

a second identification providing step of providing each of the ancillary images created based on the input data with a second identification for identifying the ancillary image;

an ancillary image identifying step of identifying one of the ancillary images as being associated with one of the document images, based on the first and second identifications;

a composite data generating step of generating one or more pages of composite data, each page of the composite data containing one or more combinations each of which includes one of the document images and an ancillary image identified in the ancillary image identifying step as being associated with the one of the document images; and an output step of outputting each page of the composite data generated in the composite data generating step.

9. The computer readable medium according to claim 8, wherein the instructions cause the processor to further perform an output preview step of, in advance of outputting the composite data, previewing a positional relationship between the document image and the ancillary image in each of the combinations contained on each page of the composite data.

10. The computer readable medium according to claim 8, wherein the instructions cause the processor to further perform an acquisition preview step of, in advance of acquiring the image data of the document sheets, previewing set positions where the document sheets are to be set on the image acquiring unit and a correspondence relationship between the document sheets and the ancillary images based on the input data.

11. The computer readable medium according to claim 8, wherein the instructions cause the processor to further perform a positional relationship changing step of changing a positional relationship between the document image and the ancillary image in each of the combinations contained on each page of the composite data.

12. The computer readable medium according to claim 11, wherein the positional relationship changing step comprises a step of selecting and setting one of predetermined layout patterns that define respective positional relationships between the document image and the ancillary image in each of the combinations contained on each page of the composite data.

13. The computer readable medium according to claim 11, wherein the positional relationship changing step comprises a step of changing a total number of the combinations contained on each page of the composite data.

* * * * *